United States Patent [19]

Miller

[11] Patent Number: 5,345,263

[45] Date of Patent: Sep. 6, 1994

[54] COMPUTER COLOR MONITOR TESTING METHOD AND PORTABLE TESTING APPARATUS

[76] Inventor: Charles M. Miller, 10620 Branham Fields Rd., Duluth, Ga. 30136

[21] Appl. No.: 97,122

[22] Filed: Jul. 26, 1993

[51] Int. Cl.⁵ ............................................. H04N 17/02
[52] U.S. Cl. ..................................... 348/182; 348/191; 345/904
[58] Field of Search ................... 358/10, 139; 364/487; 345/94, 132; H04N 17/04

[56] References Cited

U.S. PATENT DOCUMENTS

| | | | |
|---|---|---|---|
| 4,893,925 | 1/1990 | Sweeney et al. | 356/72 |
| 4,897,721 | 1/1990 | Young et al. | 358/139 |
| 4,914,506 | 4/1990 | Kafer et al. | 358/10 |
| 4,953,017 | 8/1990 | Ivey et al. | 358/139 |
| 5,027,058 | 6/1991 | Kleck et al. | 358/10 X |
| 5,245,413 | 9/1993 | Teichner et al. | 358/10 |

Primary Examiner—Victor R. Kostak
Attorney, Agent, or Firm—John R. Flanagan

[57] ABSTRACT

A computer color monitor portable testing apparatus includes a programmable microprocessor storing a software program and producing timing and control signals in response to operation of the program to generate selected color patterns on a selected one of different types (CGA, EGA and VGA) of color monitors to be tested, a pair of connectors one of which can be selected for connecting with a selected one of the different types of color monitors to be tested, and a mode selector switch connecting the microprocessor with the connectors and being actuatable for selecting the different operational modes for testing the different types of monitors.

20 Claims, 3 Drawing Sheets

COMPUTER COLOR MONITOR TESTING METHOD AND PORTABLE TESTING APPARATUS

BACKGROUND OF THE INVENTION

1. Field of the Invention

The present invention generally relates to computer color monitor testing equipment and, more particularly, is concerned with a method and portable apparatus for generating a colorbar to test a computer color monitor.

2. Description of the Prior Art

Problems occurring in the color monitor of a computer system can be due either to a malfunction in the color monitor itself or in the computer to which the color monitor is connected. No quick and easy way to isolate the problem has been devised heretofore.

At the present time, a service technician must substitute a properly functioning computer, color monitor and video card for the ones under test in order to eventually isolate the source of the problem. The current testing procedure thereby assumes the ready availability of these other components to properly carryout the testing procedure. When providing field service, as compared to shop maintenance, the service technician cannot be certain that these other components will be available and so must take along the necessary substitute components on service calls.

Thus, this current testing procedure under use, particularly in conjunction with providing field service, is time-consuming, frustrating and costly to carry out. Consequently, a need exists for a quicker and less burdensome way of testing a computer system color monitor when either the computer or color monitor is suspect.

SUMMARY OF THE INVENTION

The present invention provides a computer color monitor testing method and portable testing apparatus designed to satisfy the aforementioned needs. The portable testing apparatus of the present invention fulfills the need in both the areas of field service and shop maintenance by allowing the service technician to quickly isolate display problems without having to swap computers, monitors or video cards and without having to open the computer housing. By simply disconnecting the monitor from the computer and connecting the monitor to the portable testing apparatus of the present invention, most problems can be isolated.

By employing the portable testing apparatus of the present invention, it is equally easy to test monitors at the warehouse or on the storage shelf. Just power up the monitor and only connect the portable testing apparatus to the monitor in order to determine the operational status of the monitor. No lugging of a computer to the monitor, or vice versa, is necessary. Sales personnel delivering a monitor to a customer either at the service counter or customer site can display the operational status of the monitor to the customer on the spot. By providing separate test patterns and modes of operation for VGA (video graphics array), CGA (color graphics adapter) and EGA (enhanced graphics adapter) monitors, the portable testing apparatus of the present invention is capable of testing most color monitors in current use.

Accordingly, the present invention is directed to a computer color monitor portable testing apparatus which comprises: (a) control means for producing timing and control signals to generate a selected one of different color patterns on a selected one of different types (CGA, EGA and VGA) of color monitors to be tested;; (b) connector means for connecting with a selected one of the different types of color monitors to be tested; and (c) selector means for connecting the control means with the connector means and being actuatable for selecting different operational modes for testing the different types of monitors. The testing apparatus also comprises (d) isolator means for connecting the control means with the connector means so as to isolate the control means from the selected monitor under test to prevent electrical damage to the control means should the monitor happen to be defective. The control means also stores a software program and produces timing and control signals in response to operation of the program to generate the selected color patterns on the selected one of the different types (CGA, EGA and VGA) color monitors to be tested.

The present invention also is directed to a computer color monitor testing method, comprising the steps of: (a) connecting a testing apparatus with a selected one of different types of color monitors to be tested; (b) selecting one of a plurality of different operational modes of the testing apparatus corresponding to the selected one of the different types of monitors to be tested; and (c) producing timing and control signals corresponding to the operational mode selected to thereby generate one of a plurality of different color pattern on the selected one of the different types of color monitors in order to test operational quality of the selected monitor.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
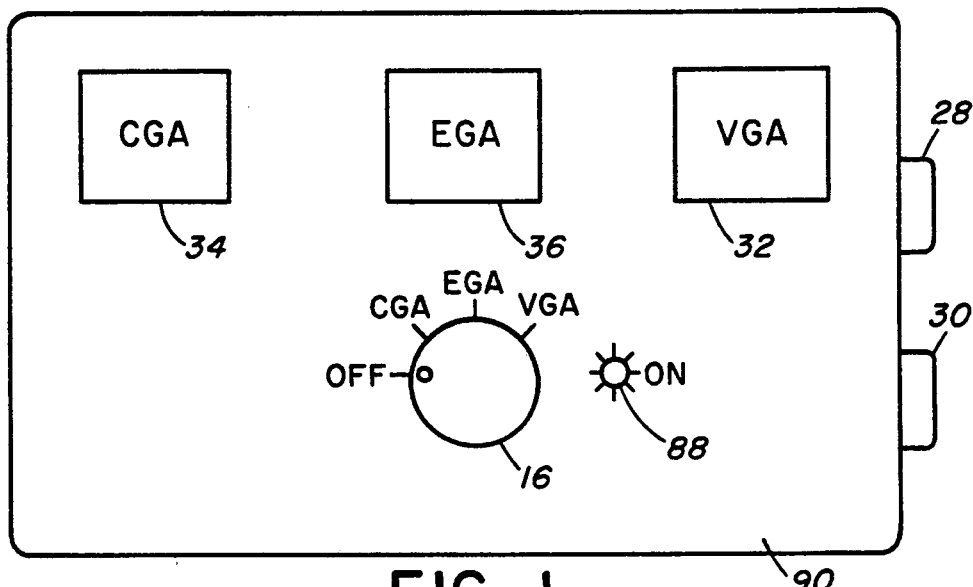
FIG. 1 is a plan view of a front panel of the computer color monitor portable testing apparatus of the present invention.
Figure 2:
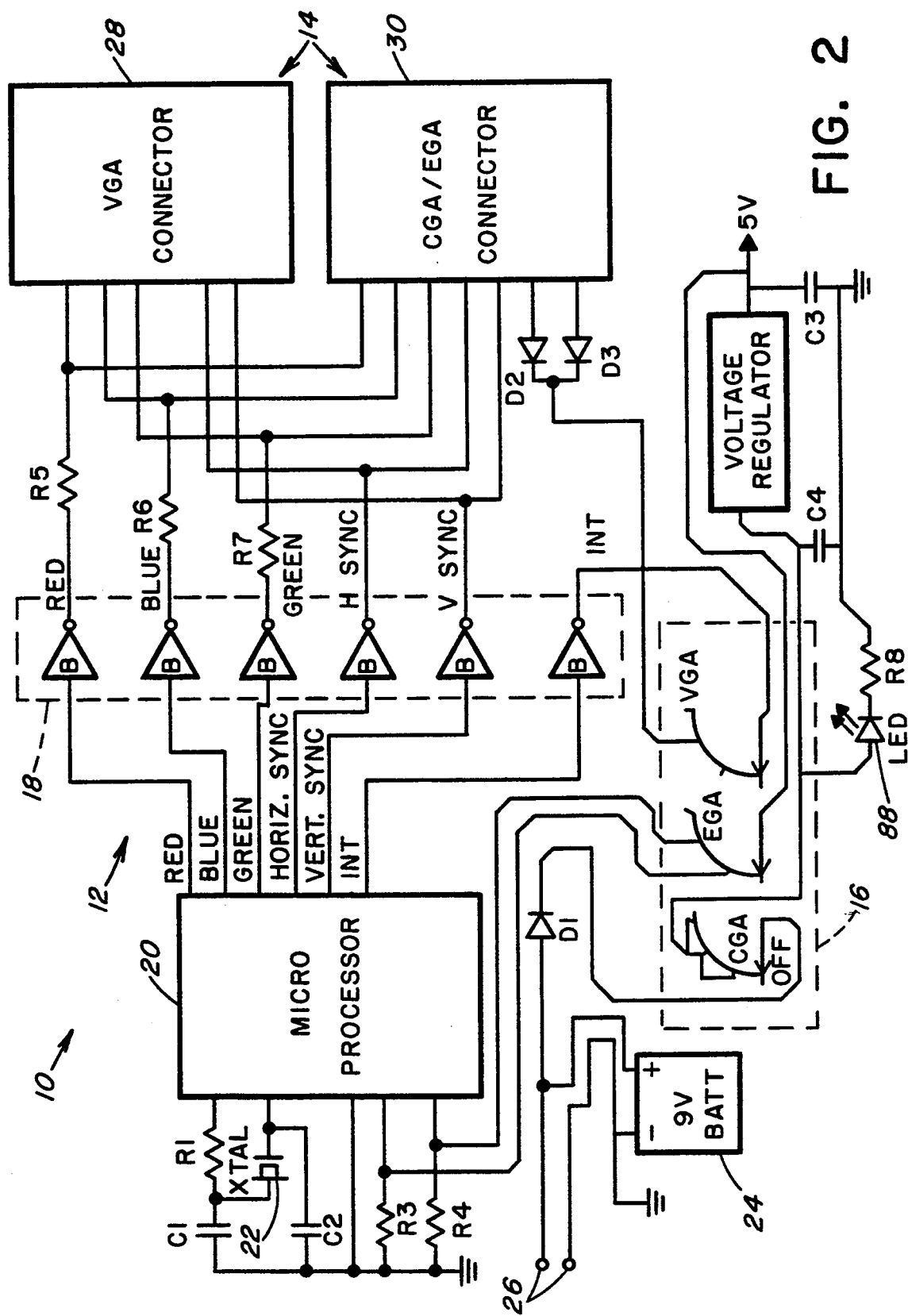
FIG. 2 is a block diagram of the portable testing apparatus shown FIG. 1.

Referring to the drawings and particularly to FIGS. 1 and 2, there is illustrated a portable, handheld, battery-operated, computer color monitor testing apparatus of the present invention, being generally designated 10. Basically, the color monitor testing apparatus 10 includes control means 12 for storing a software program, such as the one depicted by the flow chart in FIG. 6, and for producing timing and control signals in response to operation of the program to program (being represented by the flow chart of FIG. 6) stored in the internal memory of the microprocessor 20. Preferably, the software program is written in the native language of the microprocessor 20. In response to the instructions of the stored program, the microprocessor 20 generates six signals, red video, blue video, green video, horizontal sync, vertical sync and intensity, to produce the selected color patterns on a selected one of different types of color monitors to be tested. There is a different operational mode for each different type of color monitor. In each of the different operational modes, the aforementioned signals are different. The timing for the video signals changes, while both the timing and phase of the horizontal and vertical sync changes for each mode. All of the variances are achieved via the software program stored in the microprocessor 20.

The connector means 14 of the testing apparatus 10 includes a VGA connectors 28 and a CGA/EGA connector 30 adapted for connecting with the selected one of the color monitor types to be tested. In exemplary forms, the VGA connector 28 is identified by the designation DB15HD, while the CGA/EGA connector 30 is identified by the designation D89. The respective inputs of these connectors 28, 30 are connected in parallel to the respective outputs of the microprocessor 20 so as to each simultaneously receive the red, blue and green video signals and the horizontal sync, vertical sync and intensity signals therefrom. However, at one time, only the appropriate one of the connectors 28, 30 is connected to the particular type of color monitor being tested.

The isolator means 18 of the testing apparatus 10 which interconnects the outputs of the microprocessor 20 with the inputs of the connectors 28, 30 is provided so generate selected color patterns on a selected one of a plurality of different types (CGA, EGA and VGA) of color monitors to be tested, connector means 14 for connecting with the selected one of the color monitor types to be tested, and a mode/power selector means 16 for connecting the control means 12 with connector means 14 and being actuatable for selecting one of a plurality of different operational modes for testing the selected one of the color monitor types to be tested. The testing apparatus 10 also includes isolator means 18 for connecting the control means 12 with the connector means 14 so as to isolate the control means 12 from the particular monitor type under test to prevent electrical damage to the control means 12 should the monitor happen to be defective.

The control means 12 of the testing apparatus 10 includes a microprocessor 20 and a crystal oscillator 22 connected to the microprocessor 20. The microprocessor 20 provides all of the precision timing and mode switching and control signals to generate the appropriate color patterns for the different types of color monitors to be tested. As an example, the microprocessor 20 can be implemented by a programmable microprocessor being commercially available from Microchip Technology and identified by the number PIC16C5x series. This device incorporates a CPU, (E)PROM, RAM and I/O in a single chip. The oscillator 22 provides the time reference and clocking signals for operating the microprocessor 20. The testing apparatus 10 also includes a source of electrical power in the form of either a battery 24, such as a 9 volt dc battery, or a connector 26 for connecting the apparatus to an external 9 volt dc adapter.

The logic employed by the control means 12 of the testing apparatus 10 is preferably based in a software as to isolate the microprocessor 20 from the particular monitor type under test to prevent electrical damage to the microprocessor 20 should the monitor happen to be defective, such as having any shorted connections. The isolator means 18 is implemented by a plurality of op amps B functioning as buffering devices which provide both additional level of drive and protection for the microprocessor 20.

The selector means 16 of the testing apparatus 10 is a mode/power selector switch 16 connected to the microprocessor 20 and being actuatable for selecting one of a plurality of different operational modes for operation of the microprocessor 20 in testing the selected one of the color monitor types. The selector switch 16 has an "off" position and a plurality of positions, identified as CGA, EGA and VGA, each of which represents the one of the plurality of different monitor types which can be tested using the testing apparatus 10.

Thus, by turning the selector switch 16, the correct mode for the type of color monitor under test is generated. The microprocessor 20 generates a different screen or display color bar pattern for each type of color monitor. This allows the operator to verify the exact type of color monitor and its operational mode. By implementing the testing apparatus 10 with a single chip microprocessor 20, a level of functionality and size reduction has been achieved that has not been attained heretofore.

Figure 4:
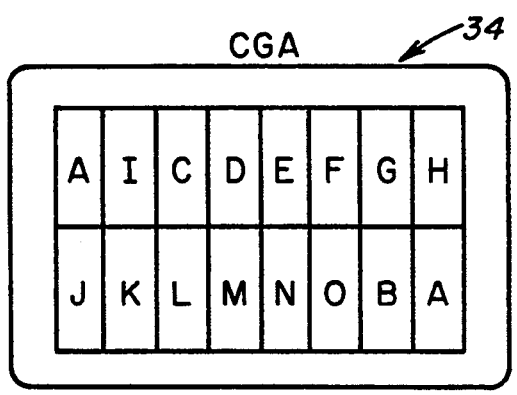
FIG. 4 is an enlarged plan view of a CGA test pattern printed on the front panel of the portable testing apparatus shown in FIG. 1.
Figure 5:
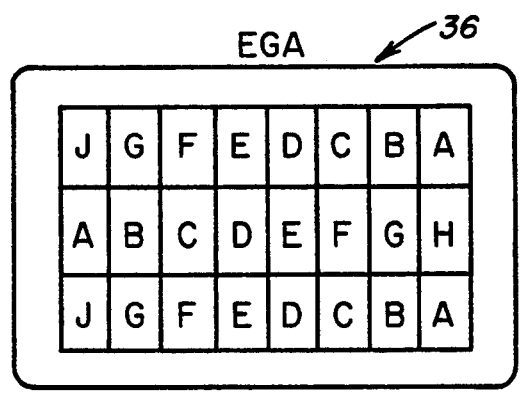
FIG. 5 is an enlarged plan view of an EGA test pattern printed on the front panel of the portable testing apparatus shown in FIG. 1.
Figure 3:
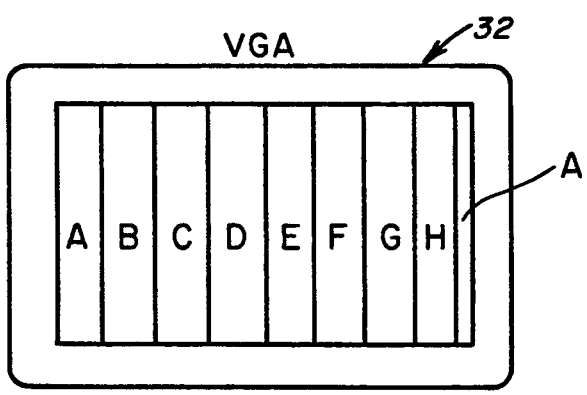
FIG. 3 is an enlarged plan view of a VGA test pattern printed on the front panel of the portable testing apparatus shown in FIG. 1.

The portable testing apparatus 10 provides test patterns 32, 34, 36 for VGA, CGA and EGA color monitors, as shown respectively in FIGS. 3, 4 and 5. More particularly, in the VGA mode, the testing apparatus 10 generates a series of eight colorbars, as seen in the VGA test pattern 32 of FIG. 3. In the CGA mode, the testing apparatus 10 generates a series of sixteen colorbars with both high and low intensity, as seen in the CGA test pattern 34 of FIG. 4. In the EGA mode, the testing apparatus 10 generates three rows of eight colorbars, as shown in the EGA test pattern 36 of FIG. 5. The letters set forth in the test patterns of FIGS. 3-5 represent different colors in accordance with the listing in Table 1 below.

TABLE 1

| Letter | Color |
| --- | --- |
| A | White |
| B | Yellow |
| C | Magenta |
| D | Red |
| E | Cyan |
| F | Green |
| G | Blue |
| H | Black |
| I | Brown |
| J | Gray |
| K | Light Blue |
| L | Light Green |
| M | Light Cyan |
| N | Light Red |
| O | Light Magenta |

Figure 6:
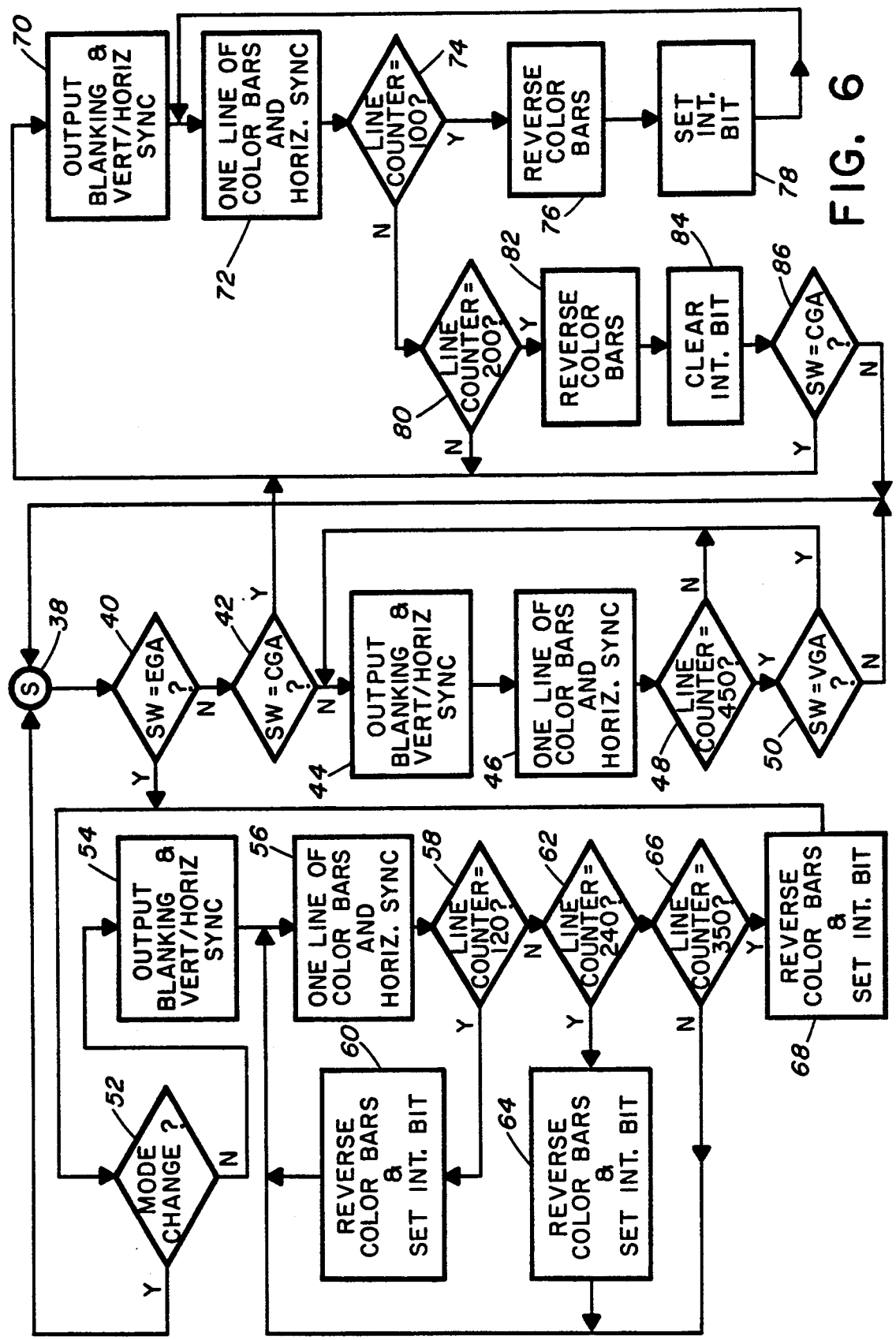
FIG. 6 depicts a flow chart of a software program stored in and employed to operate a microprocessor of the portable testing apparatus of the present invention.

Referring to FIG. 6, there is illustrated a flow chart of the software program stored in and employed to operate the microprocessor 20 of the portable testing apparatus of the present invention. After initially executing a power-up mode, the program begins at a circle symbol 38, labeled "S". At this time, the various program values are set and modes for the I/O (input-output) are set.

The next series of functions performed by the program is that the various switch inputs are looked at to determine if one of them is selected. As per diamond symbol 40, labeled "SW=EGA?", the first function looked at is the switch input for the EGA mode to determine if this mode is selected. If not selected, then, as per diamond symbol 42, labeled "SW=CGA?", the second function looked at is the switch input for the CGA mode to determine if this mode is selected. If not selected, meaning neither EGA nor CGA modes were selected, then the VGA mode must be the one selected.

If the VGA mode was selected, then, as per block symbol 44, labeled "OUTPUT BLANKING & VERT/HORIZ SYNC", and succeeding block symbol 46, labeled "ONE LINE OF COLOR BARS AND HORIZ. SYNC", the program causes the testing apparatus 10 to output vertical and horizontal synchronizing signals, at the appropriate rate and representing 20 blank lines of video. Next, the video outputs are set (RED, GREEN, BLUE outputs), to represent the programmed color. This setting changes each ⅛ of the time required for one scan line. Thus, eight different color bars are represented on each line. Each scan line ends with a horizontal sync. pulse being output to the appropriate pin. This loop is cycled for 450 times. As per diamond symbol 48, labeled "LINE COUNTER=450?", the number of cycles are counted. When the 450th line is counted, the program then checks, as per diamond symbol 50, labeled "SW=VGA MODE?", to see if the mode switch has been changed from VGA. If it has not changed (answer is "yes"), then the program returns to the block symbol 44 which is the point where the testing apparatus 10 outputs 20 lines of blanking and sync. This cycling through the blanking and sync loop (composed of block and diamond symbols 44, 46 and 48) continues until the mode is changed (answer at diamond symbol 50 is "no") or the testing apparatus 10 is turned off.

If at the start of the program the EGA mode was the one selected or the mode has now changed to the EGA mode, (answer to diamond symbol 40 is "yes"), then after a negative response to diamond symbol 52, labeled "MODE CHANGE?", the program jumps to a second blanking and sync loop which will output the correct number of sync and blank video lines, as per block symbol 54, labeled "OUTPUT BLANKING & VERT/HORIZ SYNC". Following that, the outputs (RGB) will be set to display the desired color bar, as per block symbol 56, labeled "ONE LINE OF COLOR BARS AND HORIZ SYNC". This setting changes each ⅛ of the time required for one scan line. Thus, eight different color bars are represented on each line. Each scan line ends with a horizontal sync pulse being outputted to the appropriate pin. This cycle continues for 120 lines. As per diamond symbol 58, labeled "LINE COUNTER=120?", the number of cycles are counted. When the 120th line is counted, the program then causes the Intensity output bit to be set and the order of the change each ⅛ of the scan line RGB to be reversed, as per block symbol 60, labeled "REVERSE COLOR BARS & SET INT. BIT". This results in the next series of output scan lines to display the color bars in the reverse order of the first 120 scan lines. The attached monitor will also, due to the Intensity signal being set, raise the "Brightness" of the displayed signal. This allows the technician to verify that the video "Contrast" control is working. This cycle continues for 120 lines. As per diamond symbol 62, labeled "LINE COUNTER=240?", the number of cycles are counted. When the 240th line is counted, the program then causes the Intensity output bit to be reset and the order of the change each ⅛ of the scan line RGB to be reversed again, as per block symbol 64, labeled "REVERSE COLOR BARS & SET INT. BIT". This results in the next series of output scan lines to display the color bars in the reverse order of the second 120 scan lines, or the same as the first 120 scan lines. This continues for the next 110 lines. As per diamond symbol 66, labeled "LINE COUNTER=350?", the number of cycles are counted. When the 350th line is counted, the program then reverses again the color bar order and sets the intensity bit, as per block symbol 68, labeled "REVERSE COLOR BARS & SET INT. BIT", and jumps to the diamond symbol 52, labeled "MODE CHANGE". If no change is detected (the answer to diamond symbol 52 is "no"), then the program cycles again through the above-described second loop. If the mode has changed (answer to diamond symbol 52 is "yes"), then the program returns to S (Start), as per circle symbol 38.

If at the start of the program the CGA mode was the one selected or now the mode has changed to the CGA mode, (answer to diamond symbol 42 is "yes"), then the program jumps to a third blanking and sync loop which will output the correct number of sync and blank video lines, as per block symbol 70, labeled "OUTPUT BLANKING & VERT/HORIZ SYNC". Following that, the outputs (RGB) will be set to display the desired color bar, as per oval symbol 72, labeled "ONE LINE OF COLOR BARS AND HORIZ SYNC". This setting changes each ⅛ of the time required for one scan line. Thus, eight different color bars are represented on each line. Each scan line ends with a horizontal sync pulse being outputted to the appropriate pin. This cycle continues for 100 lines. As per diamond symbol 74, labeled "LINE COUNTER=100?", the number of cycles are counted. When the 100th line is counted, the program then causes the Intensity output bit to be set and the order of the change each ⅛ of the scan line RGB to be reversed, as per successive block symbols 76, 78, labeled "REVERSE COLOR BARS" and "SET INT. BIT". This results in the next series of output scan lines to display the color bars in the reverse order of the first 100 scan lines. The attached monitor will also, due to the Intensity signal being set, raise the "Brightness" of the displayed signal. This allows the technician to verify that the video "Contrast" control is working. This cycle continues for 100 lines. As per diamond symbol 80, labeled "LINE COUNTER=200?", the number of cycles are counted. When the 200th line is counted, the program then causes the Intensity output bit to be reset and the order of the change each ⅛ of the scan line RGB to be reversed again, as per successive block symbols 82, 84, labeled "REVERSE COLOR BARS" and "SET INT. BIT". The program now determines whether the mode switch still selects the CGA mode, as per the diamond symbol 86, labeled "SW=CGA?". If no change is detected (the answer to diamond symbol 86 is "yes"), then the program cycles again through the above-described third loop. If the mode has changed (answer to diamond symbol 86 is "no"), then the program returns to S (start), as per circle symbol 38.

It should be noted that the time for one scan line is different in each of the three operating modes. The CGA time is 63.5 microseconds for each scan line. The EGA time is 45.4 microseconds for each scan line. The VGA time is 31.7 microseconds for each scan line.

The portable testing apparatus 10 is simple to operate. The four-position combination mode/power switch is the only operational control. By selecting either CGA, EGA, or VGA mode, power is applied and the unit is ready. The color monitor to be tested is then connected to the appropriate DB15HD (VGA monitor) or DB9 (CGA, EGA monitor) connector 28, 30. The front panel power light 88 should be "on". Once the power is "on" and the monitor is connected, the monitor screen can be checked for the correct pattern.

The three patterns that are printed on the front panel 90 of the testing apparatus 10 are representative of the expected results. The actual color hue may be slightly different, but the general results should be similar. The center horizontal set of bars of the EGA pattern are slightly larger than the outer two.

In the CGA and EGA modes, the intensity (contrast) control will most likely affect one set of bars. It should also be noted that some EGA monitors will display a color other than white in the left column. This is normal. The mode may be switched from EGA to CGA and back to check the EGA monitor ability to switch to the CGA mode and back to EGA.

The VGA mode drives the monitor in the 640×480 mode. This is a mode that will function on all VGA, Multi-sync & SVGA monitors. The right side of the pattern is delimited by a while line. This allows the horizontal size and phase to be observed. Many Multi-sync monitors will function in all three modes, VGA, EGA and CGA. This makes for an interesting observation of the different modes.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A computer color monitor portable testing apparatus, comprising:
   (a) control means for producing timing and control signals to generate a selected one of a plurality of color patterns on a color monitor under test being selected from a group consisting of a video graphics array (VGA) monitor, a color graphics adapter (CGA) monitor and an enhanced graphics adapter (EGA) monitor;
   (b) connector means for connecting with said selected one of said VGA, CGA and EGA color monitors to be tested; and
   (c) selector means for connecting the control means with the connector means and being actuatable for selecting one of a plurality of different operational modes corresponding to said VGA, CGA and EGA color monitors for producing said timing and control signals to generate said selected one of said plurality of color patterns for testing said selected one of said VGA, CGA and EGA color monitors.

2. The apparatus of claim 1 further comprising:
   isolator means for connecting said control means with said connector means so as to isolate said control means from the selected monitor under test to prevent electrical damage to said control means should the monitor be defective.

3. The apparatus of claim 1 wherein said control means includes a microprocessor for generating red, blue and green video signals.

4. The apparatus of claim 1 wherein said control means includes a microprocessor for generating horizontal sync, vertical sync and intensity signals.

5. The apparatus of claim 1 wherein said control means includes a microprocessor storing a software program and being operable to produce red, blue and green video signals and horizontal sync, vertical sync and intensity signals in response to operation of the stored program to generate selected color patterns on a selected one of different types of color monitors to be tested.

6. The apparatus of claim 5 wherein said control means also includes an oscillator connected to said microprocessor and providing thereto the time reference and clocking signals for operating said microprocessor.

7. A computer color monitor portable testing apparatus, comprising:
   (a) control means for storing a software program and for producing timing and control signals in response to operation of the program to generate selected color patterns on a selected one of different types of color monitors to be tested;
   (b) a pair of connectors one of which can be selected for connecting with a selected one of different types of color monitors to be tested; and
   (c) a mode/power selecting means connected to the control means and being actuatable for selecting different operational modes for testing the different types of monitors.

8. The apparatus of claim 7 further comprising:
   isolator means for connecting the control means with said pair of connectors so as to isolate said control means from the selected monitor under test to prevent electrical damage to said control means should the monitor be defective.

9. The apparatus of claim 7 wherein said control means includes a microprocessor for generating red, blue and green video signals.

10. The apparatus of claim 9 wherein said control means includes a microprocessor for generating horizontal sync, vertical sync and intensity signals.

11. The apparatus of claim 9 wherein said control means includes a microprocessor storing said software program and being operable to produce red, blue and green video signals and horizontal sync, vertical sync and intensity signals in response to operation of said stored program to generate selected color patterns on a selected one of different types of color monitors to be tested.

12. The apparatus of claim 11 wherein said control means also includes an oscillator connected to said micro processor and providing thereto the time reference and clocking signals for operating said micro processor.

13. The apparatus of claim 11 wherein said pair of connectors are connected in parallel to said micro processor so as to each receive said red, blue and green video signals and said horizontal sync, vertical sync and intensity signals therefrom.

14. The apparatus of claim 7 wherein said selector means is a switch having an "off" position and a plurality of positions each of which representing one of said plurality of different monitor types.

15. A computer color monitor testing method, comprising the steps of:
- (a) connecting a testing apparatus with a color monitor to be tested being selected from a group consisting of a video graphics array (VGA) monitor, a color graphics adapter (CGA) monitor and an enhanced graphics adapter (EGA) monitor;
- (b) selecting one of a plurality of different operational modes of the testing apparatus corresponding to the selected one of the VGA, CGA and EGA color monitors to be tested for producing timing and control signals by the testing apparatus to generate a selected one of a plurality of different color patterns for testing the selected one of the VGA, CGA and EGA color monitors; and
- (c) producing the timing and control signals corresponding to the operational mode selected to thereby generate the one of the plurality of different color patterns on the selected one of the VGA, CGA and EGA color monitors in order to test operational quality of the selected monitor.

16. The method of claim 15 further comprising the steps of:
providing a microprocessor in said testing apparatus; and
storing a software program in said microprocessor for producing timing and control signals in response to operation of the program to operate the microprocessor in one of the plurality of different operational modes to generate the selected color patterns on the selected one of different types of color monitors to be tested.

17. The method of claim 16 further comprising the step of:
providing a switch being manually actuatable for selecting either an off position or a plurality of different positions representing said plurality of different types of monitors, said software program being operable to detect which one of the positions said switch is in so as to select the corresponding one of said plurality of operational modes of said micro processor.

18. A computer color monitor portable testing apparatus, comprising:
- (a) control means for producing timing and control signals to generate selected color patterns on a color monitor under test;
- (b) connector means for connecting with a selected one of the different types of color monitors to be tested; and
- (c) selector means for connecting the control means with the connector means and being actuatable for selecting different operational modes for testing the different types of color monitors;
- (d) said control means including a microprocessor storing a software program and being operable to produce red, blue and green video signals and horizontal sync, vertical sync and intensity signals in response to operation of the stored program to generate selected color patterns on a selected one of different types of color monitors to be tested;
- (e) said connector means including first and second connectors being connected in parallel to said microprocessor so as to each receive said red, blue and green video signals and said horizontal sync, vertical sync and intensity signals therefrom.

19. The apparatus of claim 18 wherein said selector means is a switch having an "off" position and a plurality of positions each of which representing one of said plurality of different monitor types.

20. The apparatus of claim 18 further comprising:
an electrical battery connected to said control means and selector means so as to provide a source of electrical power therefor.

* * * * *